Jan. 3, 1967 W. B. WILKINS 3,295,279
LAMINATED WALL UNIT FOR CARGO CONTAINERS AND OTHER ENCLOSURES
Filed March 30, 1964 5 Sheets-Sheet 2

INVENTOR.
*WILLIAM B. WILKINS*
BY
*Henry Kozak*
ATTORNEY

Jan. 3, 1967 W. B. WILKINS 3,295,279
LAMINATED WALL UNIT FOR CARGO CONTAINERS AND OTHER ENCLOSURES
Filed March 30, 1964 5 Sheets-Sheet 4

INVENTOR.
WILLIAM B. WILKINS
BY
ATTORNEY

Jan. 3, 1967   W. B. WILKINS   3,295,279
LAMINATED WALL UNIT FOR CARGO CONTAINERS AND OTHER ENCLOSURES
Filed March 30, 1964   5 Sheets-Sheet 5

INVENTOR.
WILLIAM B. WILKINS
BY *Henry Kozak*
ATTORNEY

United States Patent Office 3,295,279
Patented Jan. 3, 1967

3,295,279
LAMINATED WALL UNIT FOR CARGO CONTAINERS AND OTHER ENCLOSURES
William B. Wilkins, Roxboro, N.C., assignor, by mesne assignments, to Midland-Ross Corporation, Cleveland, Ohio, a corporation of Ohio
Filed Mar. 30, 1964, Ser. No. 355,789
20 Claims. (Cl. 52—268)

This invention relates to structure for cargo containers, vehicle bodies, portable office or housing quarters, or other receptacles and enclosures of comparable size.

The invention concerns particularly a receptacle or container of which a major portion is a wall unit of endless or circumambient cross section. Such a wall may be combined with rigid end frame, end wall, or door components or other elements and fixtures to complete the container construction.

It is an object of the present invention to provide a cargo container, particularly a wall unit thereof, of substantially jointless construction along the periphery of its transverse cross section and to avoid to a substantial extent the longitudinal riveted, welded, or otherwise specially fabricated joints entailed in conventional structures where, for example, construction is based on a base frame to which is attached ceiling, floor and side wall components.

It is also an object to provide a cargo container wall unit comprising as an essential component a wrapped thin sheet material enabling its manufacture by rapid assembly and mass production methods.

A further object is to provide a cargo container or wall unit therefor of high load capacity in respect to its weight.

Another object is to provide a space-enclosing structure for use as a cargo container, housing unit, or other purpose which is inherently thermally insulated, shock resistant, and resistant to the transmission of sound.

These and other objects are accomplished by the present invention which resides in a space-enclosure such as a cargo container, having as an essential structural feature, a wall unit of endless transverse cross section comprising an upper section consisting of a ceiling or top wall and two lateral walls, and a lower floor section consisting of a bottom wall and a floor supporting panel supported over the bottom wall. The unit comprises laminae of thin sheet material of which one or more continuous lengths of the material extend as superposed wraps repetitively and serially through the above-named walls. In the side walls and top walls outer laminae are separated from inner laminae by panel means comprising, e.g., paper or paper-like honeycomb material of which the length of the cells is parallel to the thickness of the respective wall. In the lower floor section and, specifically, in the bottom wall, the laminae are bonded together in a single laminated unit over which is disposed a panel occupying the lower section and extending upwardly to the level of the lower ends of the side walls.

In a preferred and practical embodiment of the invention, lengths of sheet material are not presently commercially provided in widths equal to the larger lengths of the container contemplated in the practice of this invention. Accordingly, a continuous length or sheet of the sheet material will normally comprise a plurality of strips disposed in edge-to-edge relationship in the same plane and the same lamina or laminae in the lengthwise direction of the container, so that the separation line of adjacent edges of strips in adjacent laminae do not occur one over the other, at least two sheets of strips form two series of laminae within the unit wherein the strips of one sheet are staggered relative to the strips of the other sheet. Thus, adjacent edges of one sheet occur in offset relation with adjacent edges of the superposed or subterposed sheet of strips.

All components of the wall unit are joined together by, e.g., an adhesive medium comprising the cured product of a liquid-to-paste resinous composition, or glass fabric material impregnated with the cured product of a substantially liquid resinous composition.

When required as a part of the wall unit or container, special purpose panels, corner pieces, or electric service wires or tubes may be placed between the lamina and bonded or otherwise attached to adjacent components of the unit.

Figures 1, 2:
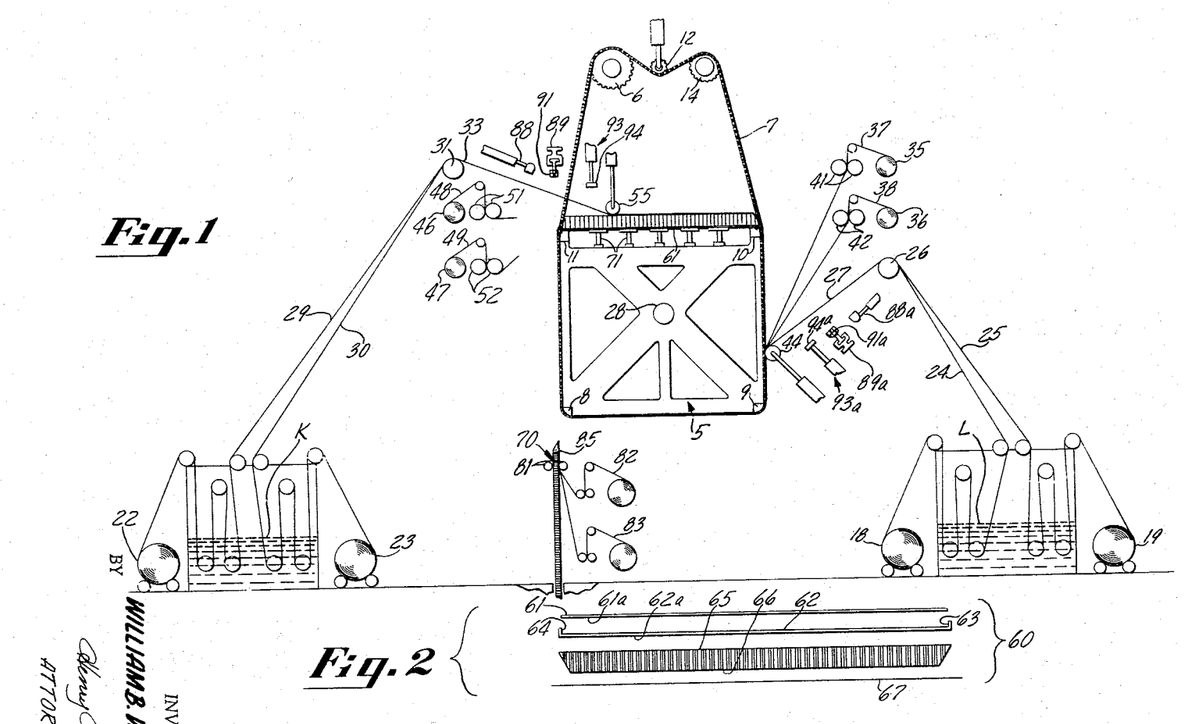
FIG. 1 is a schematic elevation illustrating a mode of supplying various strip and panel materials to a wall unit constructed on the rotatable mandrel shown.
FIG. 2 is an exploded end view illustrating various components of a floor-supporting panel.

Since a principal component of a cargo container or the wall unit thereof is a continuous sheet-like material wrapped from a single length to form laminae within said unit, construction of a wall unit suitable for use in this invention is necessarily effected on equipment comprising a rotatable mandrel and other auxiliary equipment such as illustrated in FIG. 1. In the use of this equipment, major components of the wall unit are assembled and incorporated thereinto during successive stages of winding the lamina-forming sheet material into the unit. Accordingly, components of an endless or circumambient wall unit 4 (see FIGS. 1 and 5) are supplied to or fed upon a mandrel 5 supported along a fixed axis and driven from a power source, such as one having a drive sprocket 6 connected in drive relation by sprocket chain 7 with the mandrel. The drive in connection with the mandrel 5 is effected through extension of the chain 7 around lugs 8, 9, 10, and 11 located at end-corner portions of the mandrel. These lugs have teeth which mesh with the chain. The drive further comprises a resiliently supported idler pulley 12 for keeping slack out of the chain and a stationary idler pulley 14. This driving arrangement is designed for maintaining a substantially constant rate of advancement of the periphery of the mandrel.

In a preferred construction of the cargo container, particularly the walled unit thereof, continuous strips of thin gage steel, e.g., strips approximately 3 feet wide and 0.010 inch in thickness, are supplied by rolls 18 and 19 at one side of the mandrel, and rolls 22 and 23 at the other side as viewed in FIG. 1. Strips 24 are drawn from the rolls 18 in alternate relation with strips 25, similarly withdrawn from the rolls 19, through the bath L which degrease and otherwise clean the strips. The strips meet in edge-to-edge relationship on a common roll 26 from which they proceed as a sheet 27 to the mandrel 5 to form a lamina thereon which has a substantially uninterrupted width extending the full length of the wall unit to be formed on the mandrel. In a similar manner, the rolls 22 and 23 are withdrawn as plurality of strips 29 and 30 through a cleaning bath K. The strips 29 and 30 merge at a gathering roll 31 into a single sheet 33 of the strips in edge-to-edge relation. The sheet is wrapped onto the mandrel or a component carried thereon as shown in FIG. 1. The length of the wall unit is measured in a direction parallel to the axis of rotation of the mandrel. This axis extends lengthwise and centrally of its shaft 28.

In practicing the present invention, it is necessary to bond together substantially all components of the wall unit being formed which are juxtaposed to each other in relation to a transverse plane of the mandrel axis or wall unit length. In obtaining good adhesion of the resin with the thin gauge steel strip used as a preferred material, it is necessary to have the steel surface completely free from grease or other foreign material by the degreasing baths shown. As FIG. 1 further illustrates, supply rolls 35 and 36 of continuous strips of fibrous webs are positioned relative to the mandrel and a section of the sheet 27 passing thereunto for being fed into the bite of the mandrel and the sheet. The pluralities of sheets 37 and 38 pass through sets of doctor rolls 41 and 42, respectively, which apply a liquid adhesive, such as an epoxy composition, to the sheets. The sheets 37 and 38 serve as a vehicle for a liquid adhesive, such as an epoxy composition, and when combined therewith constitute a preferred adhesive agent in practicing this invention.

After passing through the doctor rolls, the coated webs join in edge-to-edge relationship into a single membrane or adhesive member having a width substantially that of the sheet 27 as the strips 37 and 38 pass under a pressure roll 44 which firmly presses the sheet 27 against the exterior of the mandrel and components thereon.

In a similar way, supply rolls 46 and 47 provide strips 48 and 49, respectively, which pass through doctor rolls 51 and 52, respectively, to form an adhesive membrane entering the bite of the mandrel 5 and the sheet 33 for the purpose of bonding the sheet 33 to an underlying component of the wall unit 4 (see FIG. 6) previously applied to the mandrel 5. The sheet 33 and the adhesive membrane discharged by the doctor rolls is joined with an underlying component in the same manner as described with respect to sheet 27. That is to say, the sheet 33 and the membrane pass into the nip of a pressure roll 55 and the container component carried on the mandrel.

Figure 3:
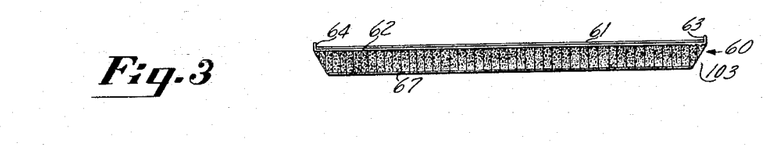
FIG. 3 is an end view of the floor supporting panel in assembled condition.

Although the basic wall-forming wrapping procedure may be practiced for circumambient wall structures other than those of cargo containers, construction of a container wall unit is herein further disclosed as including, as a step previous to any wrapping operation, the provision of a floor-supporting component which, when prefabricated, may then be included in the wrapping procedure at a proper stage. A floor-supporting inlay panel 60 is shown in assembled condition in FIG. 3 and in exploded condition in FIG. 2. With respect to its usual position in the container, the panel 60 comprises, in a preferred form, an upper planate steel sheet 61, another steel sheet 62 with turned-up edges 63 and 64, a honeycomb resin impregnated slab 65, a cured resinous-foam material which fills the cells of the honeycomb slab derived, e.g., by urethane foam-resin compositions known to the art, and a porous paper sheet 67 normally adhered to inclined side and bottom surfaces of the slab 65, as shown in FIG. 3.

As usual procedure, the panel 60 is constructed in an upside-down orientation on a mold or work table. That is to say, the first part to be placed on the table is the upper sheet 61 with its undersurface 61a coated with adhesive and facing upwardly. The sheet 62 is then placed over the sheet 61 with its undersurface 62a now facing upwardly, having been previously coated with a foamable resinous liquid composition adjusted and mixed for foaming within a few minutes. Next applied is the slab 65 received by the undersurface 62a covered with the foamable material. At this stage, the undersurface of the slab 66 faces upwardly with its honeycomb cells opening upwardly. Before this material can start foaming, the slab is covered with the porous paper sheet 67, and a conforming platen is brought downward against the upper surface (normally the undersurface) of the sheet 67 to maintain the panel components in tight relationship while awaiting the curing of the liquid adhesive material, and foaming and curing of the foamable composition. During this period, the foamable composition foams to expel air through the porous paper 67 and bond therewith. During the press operation, the foamable material and the adhesive materials substantially cure to effect complete bonding of the paper, the slab, and the steel sheet 62 into an integral unit.

In practice, it is desirable to form the panel 60 just described in a factory location which is slightly elevated and longitudinally offset with respect to the upper peripheral portion of the mandrel 5. This permits the panel 60 to be moved from its final assembly and pressing operation in upside-down position along a horizontal endwise path into position over a plurality of suction cups 71 (see FIG. 1) of the mandrel. The suction cups face outwardly in a plane along one portion of the periphery of the mandrel and are operative and normally face upwardly when the cups engage the smooth metallic surface of the sheet 61 during placement of the assembled panel 60 shown in FIG. 3. The cups 71 are energized, i.e., subjected to vacuum, by a vacuum system (not shown) carried on the mandrel which may include a motor and vacuum pump arranged, energized, and controlled in a conventional manner.

Before the various components of a cargo container wall may be wrapped into place on the mandrel 5, another panel 70 must be assembled. This panel, although constructed while disposed in a plane, is shown vertically shortened in FIG. 4 and folded in U-shaped as when contained within the sides and the top of the container. For simplicity of description, the components of the panel 70 may be considered to consist of an outer metal sheet 73, a honeycomb slab 74, and three metal sheets 75, 76, 77, and wood blocks 78 and 79. For simplicity of description, each component just named will be considered to have a length equal to that of the container or trailer body being constructed although, as practical matter, each component, particularly the honeycomb slab and the metal sheets, are normally furnished in standard widths that are but a minor fraction of the length of the container as ordinarily constructed in practicing this invention, e.g., a length of 40 feet, and will consequently comprise a plurality of smaller pieces in edge-to-edge relationship.

Figure 4:
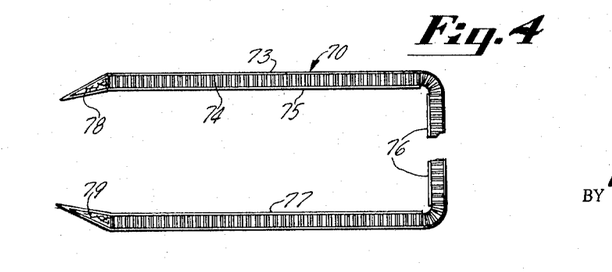
FIG. 4 is an end view of a side-and-top wall laminae-separating panel shortened along its top portion.

The panel 70 may be assembled, for example, by spreading semi-solid to liquid resinous adhesive composition on one side of the sheet 73 and placing it with the adhesive coated side up on an assembling table, placing the honeycomb slab 74 over the sheet 73, then coating one side each of the sheets 75, 76, and 77 with the adhesive composition and placing them on the slab 74 with the coated sides in contact with the slab. Wood blocks or wedges 78 and 79 are also bonded to wedge surfaces of the honeycomb material in the arrangement illustrated by FIG. 4. As shown in FIG. 4, the steel sheets 73, 75, and 77 extend over or overlap the wedge sides of the wedge-shaped blocks or chine-pieces 78 and 79.

While FIG. 4 illustrates panel 70 as folded in order to allow the use of a compact figure, the panel will ordinarily be conveyed or led into the bite of the mandrel 5 and the adhesive sheets 48 and 49 by a propulsion device such as the rolls 81 (FIG. 1) in unfolded condition. The rolls 81 have the further function of applying fibrous web and resin sheets 82 and 83 as a single layer of adhesive agent to the side 85 of the panel 70 facing inwardly toward the mandrel. As the panel 70 is wrapped into the container wall being formed on the mandrel, the adhesive sheets are applied to the outer surface of the panel 70, i.e., the surface facing away from the mandrel, thereafter becomes covered with the steel lamina 33.

The foregoing text describes, in general, the apparatus and preparation of the fabricated components to be used in the circumambient container wall unit. The wrapping procedure to be described is facilitated by certain auxiliary equipment supported adjacent the mandrel for performing operations on the laminae 27 and 33 which precede and follow actual wrapping. For example, it is necessary to hold the leading ends of the laminae-forming sheets 27 and 33 after severance from the portions thereof wrapped on the mandrel to form a wall unit. For this purpose, a vacuum gripper 88 is provided which extends the full width of the sheet 33 and is capable of gripping the individual strips forming the sheet 33. In the same manner, the free end of the sheet 27 may be held by a vacuum gripper 88a. The vacuum gripper is supported in such a manner as to enable the vacuum head thereof to be movable longitudinally of the path of the sheet so that the leading end of the sheet may be adjusted along the path when, for example, it is necessary to bring the leading ends of the sheet into contact with the area of the floor-supporting panel to which it is attached.

It is also necessary to be able to cut the sheets 27 and 33 in a precise manner. For this purpose, cutters 89 and 89a are provided which have cutting heads 91 and 91a, respectively. Each head may be retracted by means such as the fluid-operated cylinder shown, out of the regions traversed by the sheet 27 or 33. One preferred type of cutting device is that which has a track aligned transversely of the sheet length and a cutting head which is propelled along the track. The head comprises one jaw of bifurcate construction and another jaw which reciprocates through the place of the sheet and between the legs of the other jaw to displace small, elongate, rectangular pieces of metal from the sheet as it progresses crosswise thereof.

The leading ends of the primary laminae-forming material of the wall unit, i.e., the sheets 27 and 33, are attached to a component of the container already in place on the mandrel 5. The present invention makes use of the fact that an epoxy composition or other adhesive of substantial strength and similar curing rate may be temporarily heated to accelerate its curing period to a matter of seconds. Accordingly, a sealing device is provided comprising a heatable bar or platen 94 which may be moved by means such as a fluid cylinder 93 into and out of the region traversed by the periphery of the mandrel 5 when attaching the sheet 33 to the panel 60. Another similar device for attaching the sheet 27 comprises the platen 94a and the cylinder 93a.

Each sheet 27, 33 must be firmly pressed to the underlying material on the mandrel in order to squeeze out all the air which might interfere with the bonding of adjacent lamina by the resin-bearing fibrous web fed onto the mandrel into underlying relation with the sheets 27 and 33. Pressure rolls 44 and 55 are provided for this purpose on separate mountings which, during operation, urge the rolls against material carried on the periphery of the mandrel but permit the rolls to move toward and away from such axis in accordance with the varying radial distance of the mandrel perimeter being contacted by either roll as the mandrel rotates.

To start the wrapping process, the mandrel 5 is positioned somewhat as shown in FIG. 1 to enable placement of the panel 60 over the vacuum cups 71. With the panel 60 in place on the mandrel, valves are opened between the vacuum cups and a vacuum generating system (not shown) to secure the panel in its proper position on the mandrel. The mandrel is back-rotated (counterclockwise) about 90° with respect to its normal direction of rotation to the position shown in FIG. 7. By manipulation of the sheet-gripping device 88, the leading edge of the sheet is adjusted over the flange 64 of the unit 60 which has just previously received a coating of thermo-setting adhesive. The sealing device 93 is then operated to place the heating bar thereof over the leading edge of the sheet 33 for a period, such as 3 to 5 minutes, sufficient to secure the sheet to the flange 64. With the sheet thus secured, the heater bar 94 may be retracted and the suction device deactivated to release it from the sheet 33. Rotation of the mandrel continues for about 115° to the position shown in FIG. 8, whereupon the leading end of the sheet 27 is attached approximately over, or to, the leading end of the sheet 33. In order to avoid adherence of sheet 33 to the mandrel, adhesive sheets 48 and 49 are not attached to assembly being wrapped until the mandrel has made approximately one full turn from the position of FIG. 7.

Figures 5, 6:
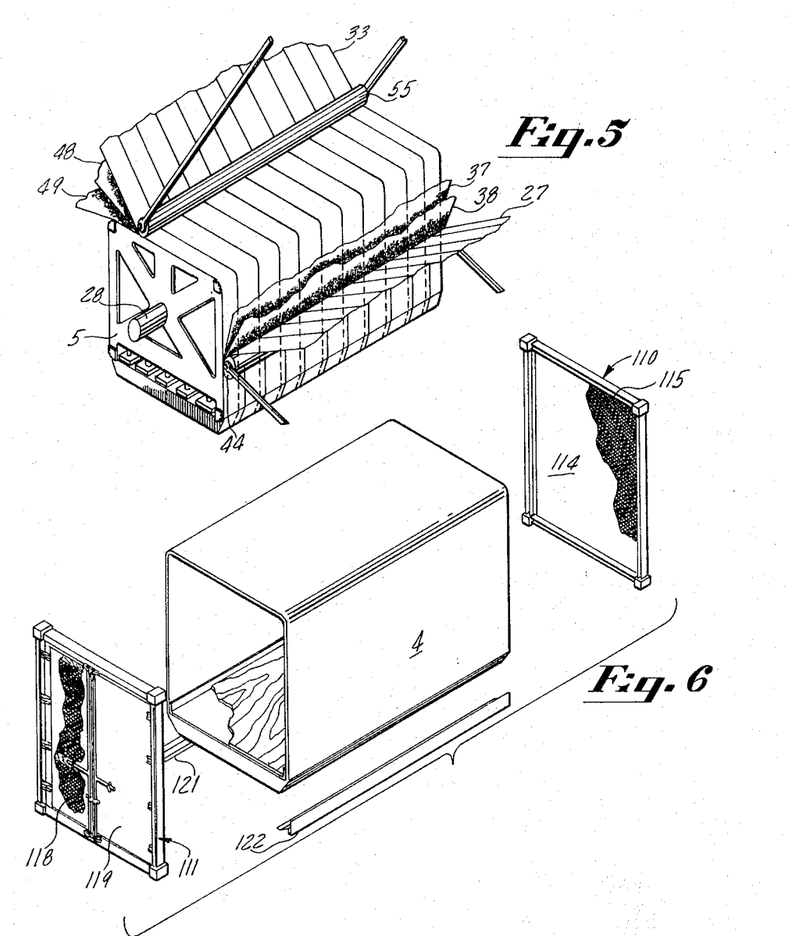
FIG. 5 is a schematic perspective view of the mandrel of FIG. 1 and the mode in which the sheets and respective strips thereof are applied to the mandrel.
FIG. 6 is an exploded perspective view illustrating various components of a cargo container in accordance with the invention.
Figures 7, 8:
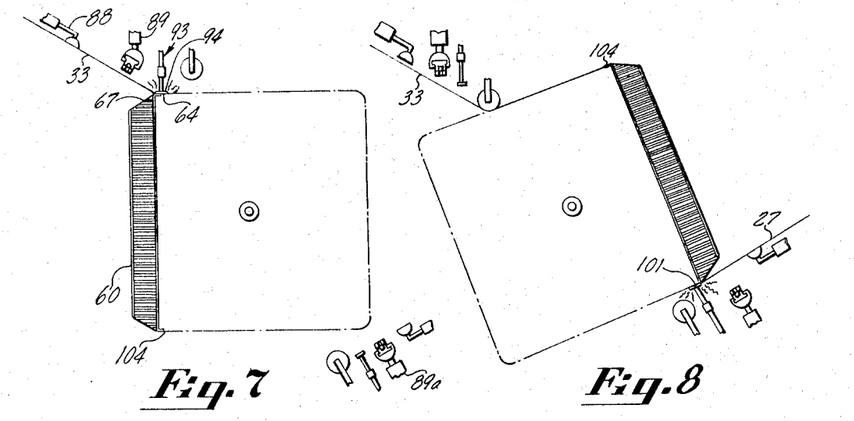
FIG. 7 is a schematic elevation of the mandrel and adjacent sheet-manipulating fixtures, and a floor-supporting panel in place on the mandrel showing the attachment of the leading end of a sheet of wall-forming strips to the panel.
FIG. 8 is a schematic elevation of a later stage in the wrapping process wherein a second sheet of strips is attached to the panel.

Wrapping now proceeds with the laying on of both sheets 27, 33 and associated adhesive layers 37 and 38 between sheets 27 and 33 simultaneously until the mandrel is approximately positioned as shown in FIG. 7. Then, the adhesive-laden fibrous strips 48 and 49 are placed into the bite formed by the sheet 33 and the panel 60 and secured therein by a slight rotation of the mandrel. At slightly further rotation which places the mandrel in the position of FIG. 9, the mandrel has been rotated as depicted in FIG. 5, through at least 320° from the position of FIG. 8 to wrap two laminae upon the mandrel, i.e., one lamina from each of the sheets 27 and 33.

Figures 9, 10, 11:
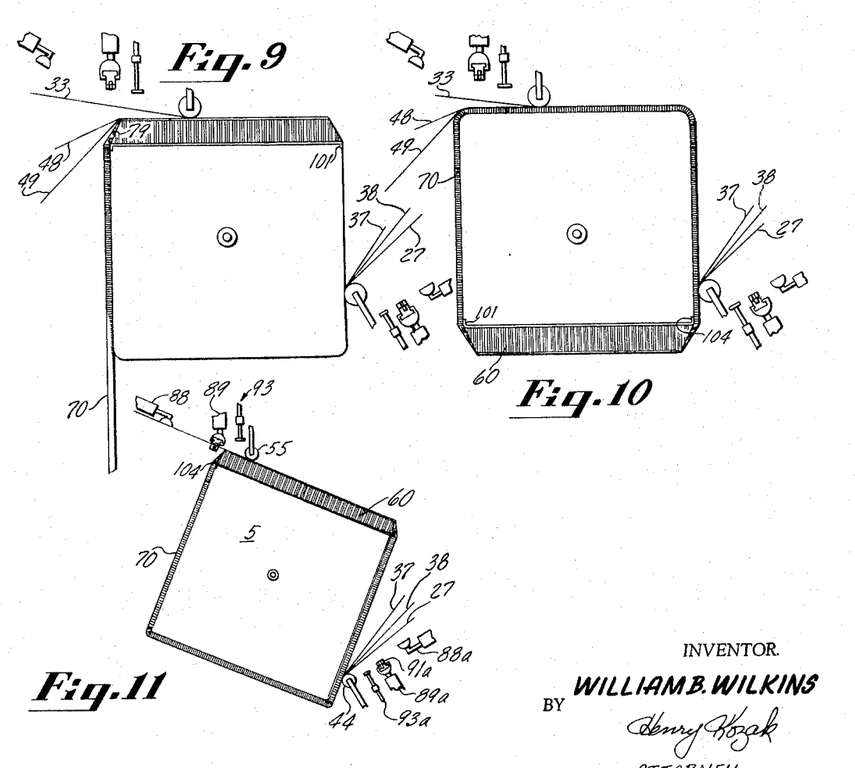
FIG. 9 is a schematic elevation of a still later stage of the process wherein the mandrel has received a laminae-spacing panel and two laminae are being applied simultaneously.
FIG. 10 is a schematic elevation illustrating a more advanced stage of the process wherein the floor-supporting panel and the panel for separating the side laminae of the side wall and ceiling have been wrapped into place by overlying laminae.
FIG. 11 is a schematic elevation illustrating the wrapping process at a stage nearing completion wherein the first attached sheet is severed from the wall unit.

When the mandrel is enclosed by two wrapped-on laminae of metal, the laminae spacing panel 70 is brought into position for being wrapped into the wall unit, as shown in FIG. 9. The panel 70 is adjusted along the mandrel and material wrapped thereon to dispose the wedge 79 thereof along the paper side surface 67 of the panel 60. With the leading edge of the panel 70 thus gripped in the bite defined by the surface 67 and the sheet 33 together with its resin and fiber adhesive layer, the accumulation of material on the mandrel is continued by sufficient rotation of the mandrel to accumulate thereon at least two more laminae from the metal sheets 27, 33. Cutting may be performed on either sheet by respective cutters 89 and 89a at any desired stage of mandrel rotation. The purposes of this invention are served satisfactorily by cutting each sheet after a complete wrap thereof about the panel 70 has been made.

To build in greater beam strength in the floor-supporting portion of the container independently of the beam strength of the container in its entirety, wrapping may be continued to the point of laying extra plies of sheets 27, 33 over the bottom of the container wall unit. For example, wrapping in the present instance commenced on each sheet 27, 33 at one lateral extremity of the panel 60. Wrapping then proceeded in the direction of rotation which laid each sheet 27, 33 over the floor-supporting panel 60. In a wrapping procedure limited to 4 wraps only, each sheet would be cut approximately at the point along the mandrel perimeter at which the sheet was initially attached. Each sheet would thus be wrapped twice around the mandrel to obtain four laminae. In the present instance, it is preferred to continue wrapping through approximately an additional quarter turn for each sheet in order to place an extra ply over the panel 60 and to delay cutting of the sheet until the container corner 104 has passed a third time under each cutter 89 or 89a. For example, FIG. 11 illustrates a stage of operation wherein the mandrel 5 is stopped, the vacuum gripper 88 has been engaged with the sheet 33 to hold it while being cut by the device 89. The sheet is shown received in the cutting head 91 of the device. It will be apparent from FIG. 11, that after cutting the sheet 33, the sheet 27 will be cut as the corner 104 of the container is rotated to a position just past the cutting head 91a of the device 89a.

After the sheet 27 or 33 is cut in each case, the heating bar of the adjacent sealer 93 or 93a is placed against the trailing end of the respective lamina and is sealed in a matter of 3 or 5 minutes against the underlying lamina or other material.

With all auxiliary material retracted, e.g., pressure rolls, heating bars, and vacuum sheet grippers, the vacuum grippers of the mandrel 71 are released and retracted from the position thereof in supporting panel 60. The unit may now be removed in its endwise direction from the mandrel.

Figure 12:
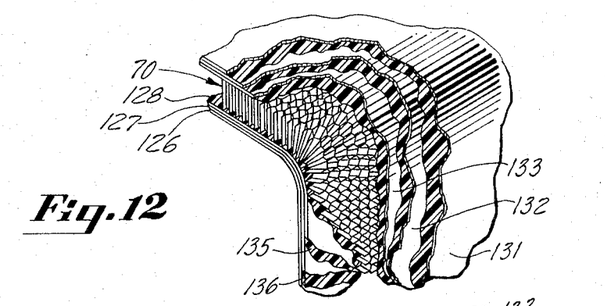
FIG. 12 is a fragmentary perspective view of an upper corner portion of the wall unit of preceding figures with various portions broken away.

FIG. 12 is illustrative of the manner in which the laminae-separating panel 70 must be formed in being wrapped around underlying laminae previously wrapped on the mandrel. It is for this reason that the sheets 75, 76, 77 are separated to allow the honeycomb material of the panel to crush along the inner periphery of the panel as it extends around the sharp corners formed by the two inner laminae of the container wall unit.

Figure 14:
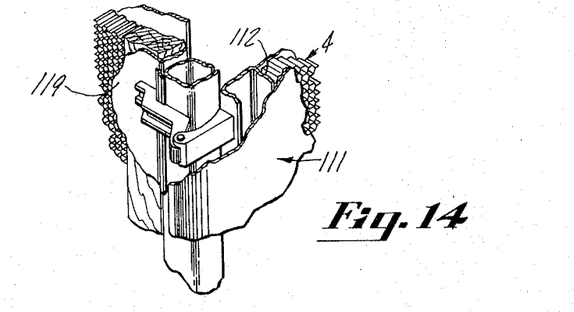
FIG. 14 is a fragmentary perspective view showing the wall unit connected with a door frame, and a door hinged to the frame.
Figure 15:
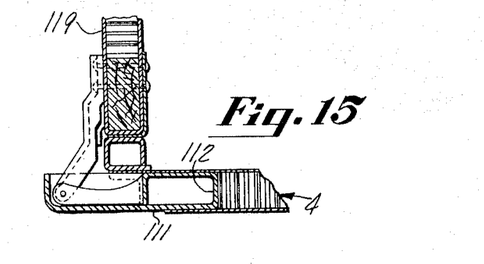
FIG. 15 is a fragmentary plan view in section of the portion of the container shown in FIG. 14.

While this invention is directed primarily to the unit 4, FIGS. 6 and 14 illustrate container components which may be added to the unit to complete the container. Typical of end frames which may be attached to end edges of the unit 4 is a blind end frame 110 and a door frame 111. Both frames are recessed in the manner shown in FIG. 14 at 112 to receive marginal edge portions of the unit 4. The frames and the unit 4 are bonded by high strength resin adhesive, such as a liquid epoxy composition. The frame 110 supports an end wall 114 attached thereto showing its metal skin broken away to expose the honeycomb material 115 disposed in the manner of a sandwich filling to space outer and inner metal laminae somewhat as found in the side and top walls of the unit 4. The frame 111 supports a pair of doors 118, 119 hinged to the frame as shown in FIG. 14. The doors may comprise the sheet metal and honecomb slab sandwich construction described with respect to the wall 114 and the unit 4.

The container further comprises a pair of rub rails 121 and 122 attached along the bottom of the unit 4 along lengthwise of opposite bottom dihedral sections or corners of the container. The upward extending flanges of the rails are disposed just outside the wedges 78 and 79 of the panel 70 and metal laminae extending thereover. The horizontally extending webs of the rub rails are secured to the underside of the wall unit 4. Preferably, the rub rails 121, 122 are joined to adjacent lower corners of the frames 110 and 111 as by welding to effectively unite the rigid metal components of the container and to further insure against any separation of the frames from the wall unit 4.

Figures 16, 17, 20:
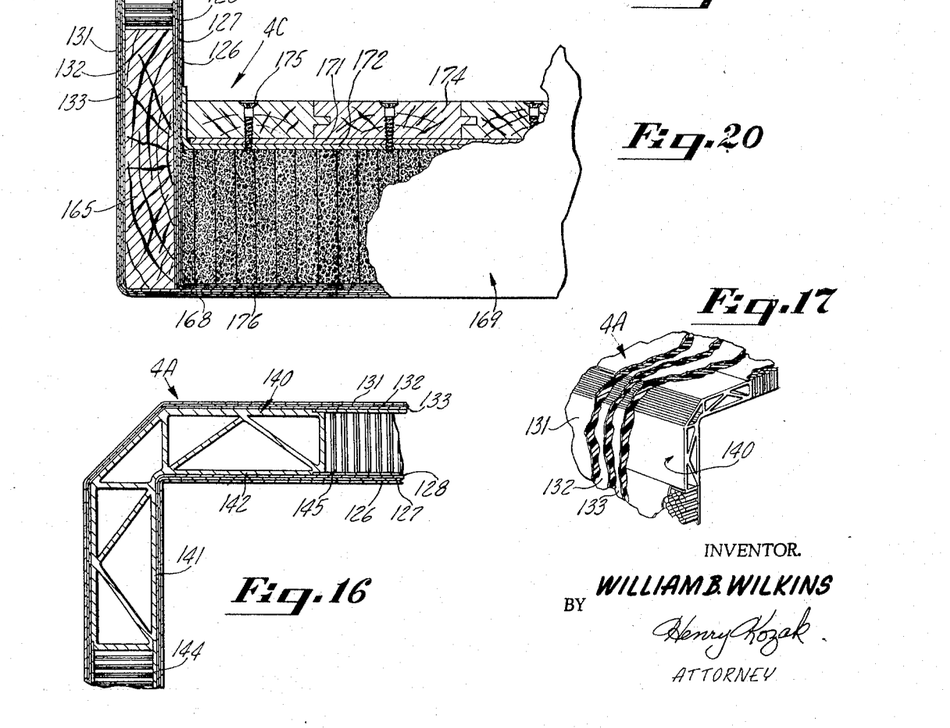
FIG. 16 is an end view elevation of an elongate corner piece and honeycomb panels in abutting relation therewith as arranged in an upper corner portion of a container in accordance with a modification of the invention.
FIG. 17 is a fragmentary perspective view with portions broken away of an upper corner portion of a cargo container incorporating the components of FIG. 16.
FIG. 20 is a fragmentary elevation in section of a lower lateral corner portion of a modified container illustrating the juncture of the side wall and floor assembly of a container in accordance with a modification of the invention.

Construction of the wall unit 4, as hereinabove described, results in the formation of three inner laminae 126, 127, 128 which are inward with respect to the panel 70, and three outer laminae 131, 132, and 133. These same laminae are observable in both FIGS. 12 and 13 along with layers of adhesive material, such as layers 135, 136, 137, and 138 which adjoin adjacent laminae. The six laminae referred to represent three complete wraps of the sheets 27 and 33. FIGS. 16 and 17 illustrate a modified wall unit 4A which provides greater structural reinforcement and rigidity at the upper corner portions of the wall unit than in the unit 4. In effect, the laminae-spacing panel 70 of the previously described embodiment as divided in unit 4A into separate components within the lateral walls and the ceiling separated at the upper unit corners by a pair of elongate corner filler members of which member 140 is shown. In the form shown, the member 140 comprises two plate-like sections 141 and 142 meeting in dihedral angular relationship along the entire length of the container corner. The sections are of the same thickness as the adjoining laminae-spacing panels 144 and 145 in order that they may be included between lamina of material such as sheet metal. As shown, components 140, 144, 145 separate the inner group of laminae 126, 127, 128 from the outer group of laminae 131, 132, 133 in the same manner as does the foldable panel 70 of the earlier described embodiment. The components 140, 144, 145 are incorporated into the wall unit at an intermediate wrapping stage, such as that referred to in describing the embodiment of FIGS. 1 to 14.

Figure 18:
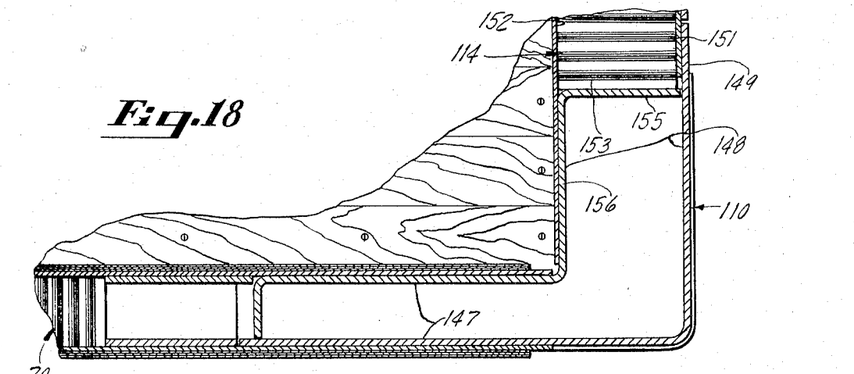
FIG. 18 is a fragmentary plan view in horizontal section of an end frame and laminae spacing honeycomb panels in abutting relation therewith as arranged along a vertical corner portion of the cargo container adjacent its closed end.

FIG. 18 is a plan view of a horizontal section taken along a vertical corner portion of the container illustrating the manner in which the closed end wall 114, the panel 70, the outer laminae 131, 132, 133 and the inner laminae 126, 127, 128 are joined. The projection of the outer and inner laminae beyond the panel 70 provides a recess for receiving the thinner leg 147 of the vertical lateral portion of the frame 110. An adhesive such as an epoxy composition is used to adhere the frame leg 147 to adjacent laminae.

A web 149 of the thicker leg 148 of the frame 110 projects in the widthwise direction of the container peripherally inward from a web 155 into overlapping relation with the end wall 114. This wall is constructed so that it may be laid against peripherally inward flanges of the frame, such as provided by the web 149, from the inside of the container. That is to say, the wall 114 comprises sheets 151 and 152 preferably of metal bonded to opposite sides of the honeycomb material 153. Sheet 151 is purposely shorter than the sheet 152 in the widthwise direction of the wall in order to pass between webs typified by the web 115, at opposite sides of the frame 110, and bear in an overlapping marginal relation with the web 149 and its counterpart at the other side of the frame. The sheet 152 of the wall 114 is correspondingly wider so as to bear on the web 156 of the corner frame 110. The sheets 151, 152 are bonded to corresponding webs of the frame by an adhesive.

Figure 19:
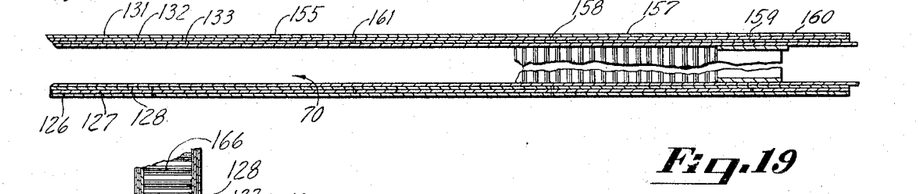
FIG. 19 is a fragmentary plan view in horizontal section of a lateral wall of the container.

FIG. 19 is a view of a cross section of a lateral wall taken along a horizontal plane. It illustrates the edge-to-edge relationship of strips which comprise each of the laminae 126, 127, 128, 131, 132, 133. For example, the lamina 131 comprises strips 155, 157, and 160. It will be noted, for example, that the separation of the strips in the lamina 132 occurs at 158 approximately one-half way between the separation strips, e.g., at 159, 161, of either lamina 131 or 133.

Figure 13:
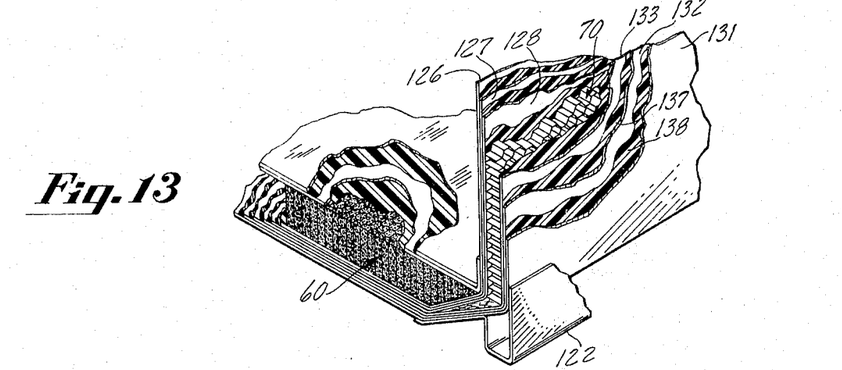
FIG. 13 is a perspective view of a lower corner section of the wall unit with portions broken away to better illustrate various components of the unit.

FIG. 20 illustrates a modification of the invention in which the components of the floor and floor-supporting portion of the container are arranged differently than in the first described embodiment, as shown by FIG. 13. The plane of section 13 is taken at right angles to the longitudinal axis of the container through a lower corner portion to best illustrate details of corner structure of the unit 4C.

The wall unit 4C in this case has a relatively massive chine piece 165 disposed between the inner laminae 126, 127, 128 and the outer laminae 131, 132, and 133 in abutting relation with the lower end surface of a honeycomb slab 166, such as found in panel 70. The chine piece may be incorporated in the wall unit along with the slab 166 in the manner described for chine piece 78 of the earlier embodiment. Obviously, it must be inserted at the same time as the slab in order to have the outer and inner laminae disposed along opposite sides but joining in extreme lower portion of the container at 168 to pass underneath the floor supporting panel 169. The latter comprises two upper plates 171 and 172 analogous to the plates 61, 62 of the floor-supporting panel 60 described earlier. Shown also in FIG. 20 is a wooden board floor 174 attached by screws 175 in threaded relation with the plates 171, 172. The honeycomb material 176 is filled with a rigid foam of synthetic resin, e.g., a polyurethane, to provide substantially greater load-supporting capacity, moistureproofness, and freedom from fungi and bacterial attack.

In the general arrangement of the container hereinabove described, the major parts of the structure, i.e., the roof, the side walls, and the floor, are of sandwich construction. The end walls may, as a preference, be also of sandwich construction. The sheet metal or other sheet materials which forms the inner and outer skins of the wall unit merges at the bottom of the container to form the lower skin of the floor. The upper skin of the floor sandwich is not integral with the wrapped laminae of the inner and outer skins of the side walls and roof. However, it is a feature of the wall unit that its skin construction is continuous and may be comprised of one or two continuous lengths of sheet material forming all of the laminae with each sheet viewed as normally comprising a plurality of strips.

After the floor-supporting structure is added to the assembled skin and sandwich components of the side walls and the roof, the result is a beam-like wall unit extremely resistant to all types of buckling that may be induced by a load placed on a floor constructed over the floor structure of the unit. Because of the sandwich construction incorporating honeycomb materials of low-heat conductivity, the metallic frame members which are usually interposed between outer and inner skins of a container or truck body may be eliminated. Thus, an inherent feature of the wall unit, according to at least one embodiment, is its resistance to heat transfer. This feature is nearly always desirable to a greater or lesser degree in the transportation industry.

The sandwich construction just described, when compared with conventional constructions requiring a basic frame upon which to build the skin or walls of the container, achieves a high percentage of utilization of space for lading within the outer confines of the container through the elimination of beams, studding, braces, etc.

The containers of the present invention, furthermore, enable a unique manufacturing technique offering significant labor-saving advantages because of its automated nature. With adequate equipment, manufacturing may be conducted upon the basis of a very short assembly period in which the wrapping of a wall unit is accompanied by simultaneous preparation of sub-assemblies, such as the floor-supporting panel, and end wall or door units. Complete assembly is then a matter of minutes plus the curing time for the adhesives used in the final assembly.

The terms and expressions which have been employed are used as terms of description and not of limitation and there is no intention of excluding such equivalents of the invention described or of the portions thereof as fall within the scope of the claims.

What is claimed is:

1. A wall unit of endless transverse cross section for use in a cargo container having a lower floor section and an upper lateral and top section comprising:
   (A) a continuous sheet material extending in a circuit repetitively through said cross section and said section to form outer and inner laminae;
   (B) substantially rigid panel means in said upper section disposed between, and thereby spacing, said outer and inner laminae;
   (C) said outer and inner laminae being juxtaposed and bonded together along portions thereof in said lower section.

2. A wall unit of endless transverse cross section for use in a cargo container having a lower floor section and an upper lateral and top section comprising:
   (A) a continuous sheet material extending in a circuit repetitively through said cross section and said sections to form outer and inner laminae;
   (B) substantially rigid panel means disposed between, and thereby spacing, the outer and inner laminae in said upper section for spacing said laminae;
   (C) said outer and inner laminae being juxtaposed and bonded together along portions thereof to form a laminated bottom wall in said lower section; and
   (D) a floor-supporting panel supported on and joined to substantially the entire upper surface of said bottom wall.

3. A wall unit of endless transverse cross section for use in a cargo container having a lower floor section and an upper lateral top section, comprising:
   (A) outer and inner laminae extending in a circuit along the outer and inner peripheries, respectively, of said cross section;
   (B) substantially rigid panel means disposed between, and thereby spacing, the outer and inner laminae within said upper section;
   (C) said laminate being juxtaposed and joined along portions thereof in said lower section to form a laminated bottom wall of said lower section; and
   (D) a floor-supporting panel supported on the upper surface of said bottom wall.

4. A wall unit of endless transverse cross section for use in a cargo container, comprising:
   (A) a top wall, a first side wall, a floor-supporting bottom wall, and a second side wall, connected in the order named, to enclose a cargo space;
   (B) said walls comprising outer juxtaposed laminate and inner juxtaposed laminae extending continuously through said walls in the order named;
   (C) substantially rigid panel means spacing said outer laminae from said inner laminae in the top and side walls;
   (D) said outer and inner laminae being juxtaposed and joined together to form said bottom wall; and
   (E) a floor-supporting panel joined to and overlying substantially the entire surface of said bottom wall.

5. The wall unit of claim 4 wherein:
   (A) certain laminae from said outer and inner laminae are constituted of a single length of sheet material extending repetitively in said walls in the order named.

6. The wall unit of claim 4 wherein:
(A) said laminae are constituted substantially of continuous sheet material extending repetitively through said walls in the order named.

7. Wall unit of claim 4 wherein:
(A) said laminae are constituted primarily of a continuous sheet material extending repetitively through said walls to include laminae from both the outer laminae and the inner laminae within a single length of said material; and
(B) said panel comprises an upper horizontal floor member extending between said side walls and is joined to said bottom wall to form a load-supporting truss structure wherein said bottom wall is a tension member and said floor is a compression member.

8. The wall unit of claim 4 wherein:
(A) said sheet material comprises at least two sets of strips with the strips of each set being in edge-to-edge parallel relationship and extending through at least one of said laminae;
(B) each laminae being constituted of a different set than the adjacent lamina and the pairs of adjacent edges of the strips of each set being in offset relation with the nearer pair of adjacent edges of the next adjacent lamina; and
(C) the wall unit comprises the adhesive means joining all of the adjacent laminae panels and panel means together.

9. The wall unit of claim 4 wherein:
(A) said panel means comprises a slab of honeycomb material with the cells thereof aligned in parallel relation to the thickness of the respective wall.

10. The wall unit of claim 4 wherein:
(A) said panel comprises a slab of honeycomb material and a sheet member joined to the upper surface of the honeycomb material, said sheet member being non-elastic and non-compressible in a plane parallel to the upper surface of the honeycomb material enabling it to function as a compression member in cooperation with the bottom floor as a tension member for rendering the floor-supporting portion of the unit resistant to vertical deflection.

11. The unit of claim 4 wherein:
(A) said laminae comprise thin sheet metal;
(B) said panel means comprise and the panel comprise slabs of paper-like honeycomb material with the cells thereof aligned parallel to its thickness, and thin metal facing sheets adhesively joined to the faces of said honeycomb slabs;
(C) the slab of the panel being substantially thicker than that of said panel means, and the thickness of the sheet metal material along the top of the panel being substantially equal to the total thickness of said laminae in the bottom wall and any other metal sheet material extending along the underside of said thicker slab; and
(D) said container comprising adhesive means joining all components of said wall unit together.

12. The wall unit of claim 4 wherein:
(A) said laminae comprise a sheet metal material;
(B) said panel means and panel comprise slabs of paper honeycomb material, the cells thereof parallel to the thickness of the respective slabs;
(C) the slab of the panel means being of sufficient size as to extend into all portions of said top and side walls and having bonded thereto on its one side a single facing sheet of thin sheet metal material, and on its other side a plurality of thin metal sheets separated along areas at which the panel means folds around the corners of the container formed at junctions of the top wall and side walls; and
(D) said panel comprises thin sheet metal material bonded to its entire upper surface having a thickness substantially equal to the total thickness of the laminae in the bottom wall and any other sheet metal material joined therewith underneath the slab of said panel.

13. The wall unit of claim 4 wherein:
(A) said laminae are separated in a lower corner portion of the container to define a region of separation extending upwardly from the junction of the laminae in the bottom floor; and
(B) the container comprises a rigidly elongate chinepiece disposed in said region lengthwise of the container in supporting relation with both the inner and outer laminae.

14. The wall unit of claim 13 comprising:
(A) an elongate outer corner-reinforcing sheet metal rail piece extending longitudinally of the container in attached conforming relation with said corner portion.

15. The wall unit of claim 14 wherein:
(A) said rail piece overlaps marginal portions of both the panel and the panel means.

16. The wall unit of claim 4 comprising:
(A) an elongate corner filler member disposed in an upper corner portion of the unit between said outer laminae and said inner laminae having two longitudinal plate-like sections joining in angular relationship lengthwise of said corner portion with one of said sections included in the top wall and the other section in a side wall merging in said corner portion; and
(B) said panel means comprises separate sections in said top and side walls correspondingly shortened to accommodate the member and be joined therewith in substantial abutting relationship.

17. The wall unit of claim 4 in combination with a pair of rigid end frames for each of opposite ends of the wall unit, wherein:
(A) said panel means and the panel are shorter than said outer and inner laminae in the lengthwise direction of the container and thus provide a recess at each end of the unit along said walls; and
(B) each end frame comprises means shaped to engage in substantially face-to-face relationship the laminae surfaces defining said recesses; and
(C) said combination comprises adhesive means for uniting all adjacent herein named components.

18. The wall unit of claim 4 comprising:
(A) a thin-mesh glass fabric impregnated with an adhesive in bonded relation with substantially all adjacent opposed surfaces of said laminae.

19. The wall unit of claim 4 wherein:
(A) the floor-supporting panel comprises an upper horizontally planate metal sheet with upturned edges secured to the innermost laminae of said laminae;
(B) a horizontal planate floor member received between said flanges;
(C) a honeycomb slab bonded to the underside of said sheet with the cells thereof arranged perpendicularly to said metal sheet; and
(D) a rigid foam of cured synthetic plastic filling said cells.

20. The wall unit of claim 4 wherein:
(A) said panel means and said panel comprise slabs of a paper-like honeycomb material having cells thereof extending in a direction parallel to the thickness of the slabs; and
(B) the slab of said panel comprises a rigid foam of cured synthetic plastic material filling said cells.

No references cited.

RICHARD W. COOKE, Jr., *Primary Examiner.*

FRANK L. ABBOTT, *Examiner.*

R. A. STENZEL, *Assistant Examiner.*